United States Patent [19]

Wojewski

[11] 3,872,725

[45] Mar. 25, 1975

[54] EXPANDABLE DEPTHOMETER

[75] Inventor: Thomas Wojewski, San Diego, Calif.

[73] Assignee: The United States of America as represented by the Secretary of the Navy, Washington, D.C.

[22] Filed: Aug. 24, 1973

[21] Appl. No.: 391,385

[52] U.S. Cl................. 73/300, 73/301, 73/398 AR
[51] Int. Cl.......................... G01f 23/18, G01l 9/02
[58] Field of Search.... 73/300, 301, 398 R, 398 AR

[56] References Cited
UNITED STATES PATENTS

| | | | |
|---|---|---|---|
| 2,802,071 | 8/1957 | Lin | 307/310 X |
| 2,901,909 | 9/1959 | Hobrough | 73/398 R X |
| 2,910,868 | 11/1959 | Fisher | 73/301 |
| 3,177,726 | 4/1965 | Fisher | 73/300 X |
| 3,651,697 | 3/1972 | Ianuzzi | 73/300 X |

OTHER PUBLICATIONS

Clark; D. B., Pressure–Sensitive Material Measures Explosion Forces . . ., Reprint from *Product Engineering*, Sept. 16, 1957.

Primary Examiner—Richard C. Queisser
Assistant Examiner—Frederick Shoon
Attorney, Agent, or Firm—Richard S. Sciascia; Ervin F. Johnston; Thomas G. Keough

[57] ABSTRACT

An expandable depthometer is electrically coupled to a pressure sensitive transducer element disposed in a marine environment. The transducer, excited by a power supply, feeds a signal, which is proportional to the depth, back to the depthometer console. A reference level signal is created across a variable resistor to produce a zero reading at selectable datum depth. A full-scale selector switch is positioned to switch in a particular impedance branch to establish a range of operation from a reference-datum level as predetermined by the reference level signal. A single readout meter is capable of showing incremental depth variations of as little as 10-feet to as much as 100-foot increments, in depths in excess of ten-thousand feet.

4 Claims, 3 Drawing Figures

EXPANDABLE DEPTHOMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Systems for determining the depth of an undersea vehicle or a package of instrumentation in the ocean have relied upon a wide variety of pressure responsive devices and suitably connected readouts. Analog, as well as digital readouts, have been used to provide visual indications over an expected range of depths which usually extend over only a few hundred feet. Within this depth range a single meter usually has been found to be sufficient to give an acceptable resolution in predetermined increments. Generally, the conventional systems functioned reasonably well at relatively shallow depths. However, with the advent and development of a deep ocean technology, men and vehicles cannot rely on a single meter or depth gauge readout to provide the definite resolution necessary for safe operations. It is a well known fact that there are pressure sensitive transducers using Bourdon tubes which are capable of producing signals that indicate the pressure at depths below and exceeding 10,000 feet. Yet, the readouts or gauges attached to these transducers do not have the resolution at extreme depths to give an accurate determination of exactly what the transducer's depth is. There exists a continuing need in the state-of-the-art for an expandable depthometer having the capability to vary its resolution over a preset range and to establish a reference datum level from which the incremental variations are observed.

SUMMARY OF THE INVENTION

The invention is directed to providing a depthometer having an expandable scale. A pressure responsive transducer feeds signals proportional to the ambient pressure to a meter in a depthometer console for providing a visual readout. A dial actuated variable resistor creates a signal representative of a referenced datum level which corresponds to a particular depth. An arrangement of parallel impedance branches and a selector switch gives the meter a capability for changing the value of its incremental increases from the reference datum level. By setting a reference datum level to a desired depth which is made with reference to the surface or the bottom, an operator quickly monitors the deviations from that depth on a meter. Because of the parallel impedance branches and selector switch, the range and magnitude of the incremental increases from the preselected reference datum level is selectively changeable by merely repositioning the switch.

A prime object of the invention is to provide an improved depthometer.

Another object of the invention is to provide a depthometer having an expandable scale.

Yet another object of the invention is to provide a depthometer having a resettable reference datum level from which variations in depth are monitored.

A further object is to provide a depthometer having a single meter providing visual readouts over several range scales from a preselected referenced datum level.

These and other objects of the invention will become more readily apparent from the ensuing description when taken with the drawings.

DESCRIPTION OF THE PREFERRED EMBODIMENT

Figure 1:
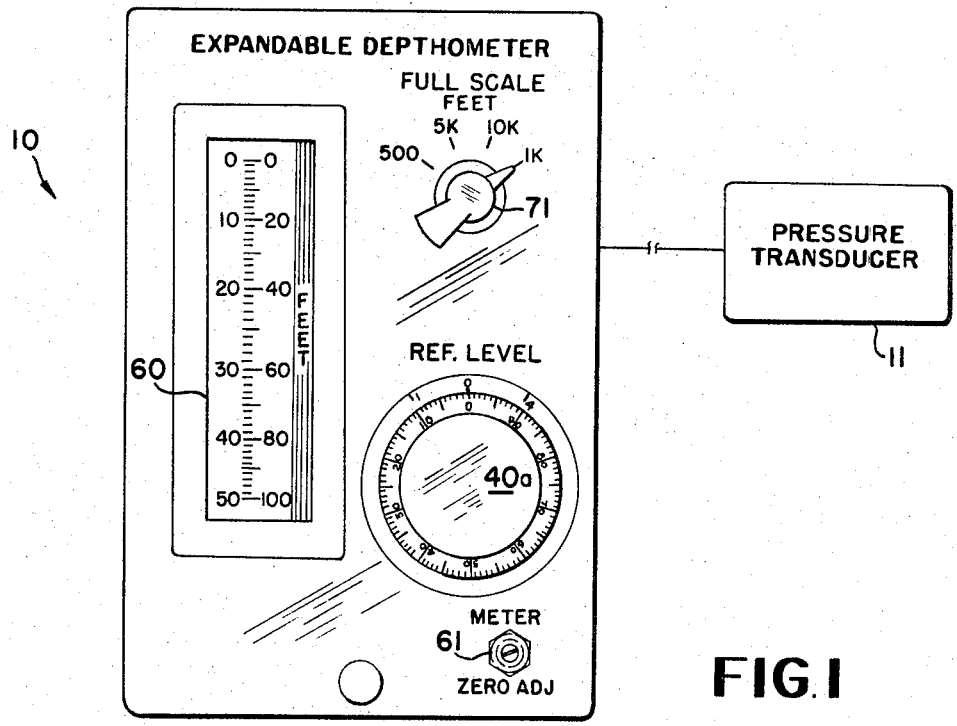
FIG. 1 is a front view of the expandable depthometer.
Figure 2:
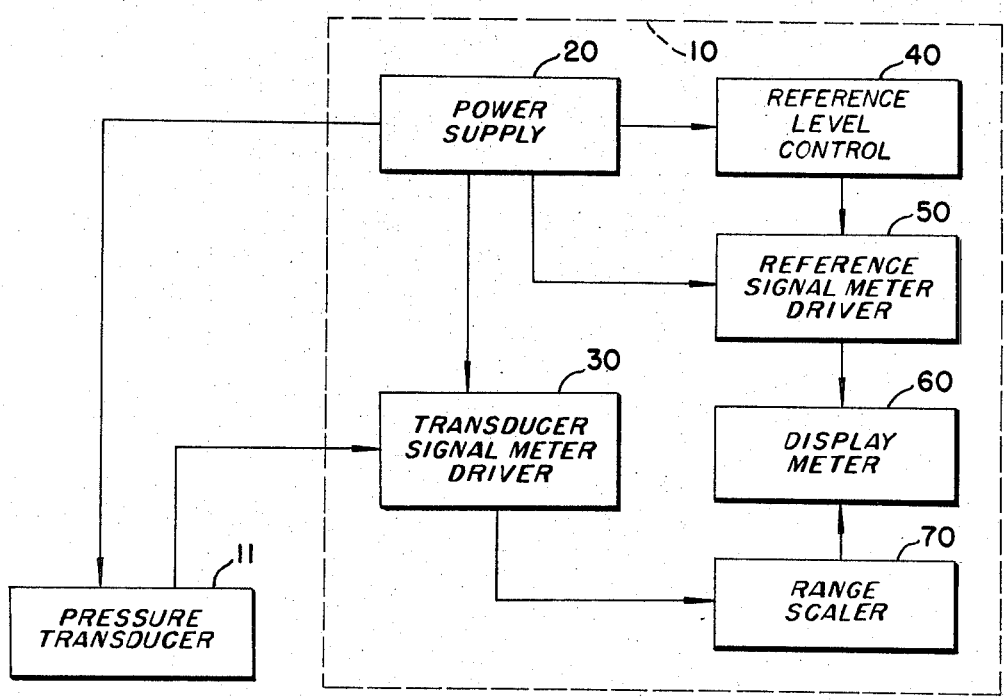
FIG. 2 is a block, diagrammatic representation of the invention.
Figure 3:
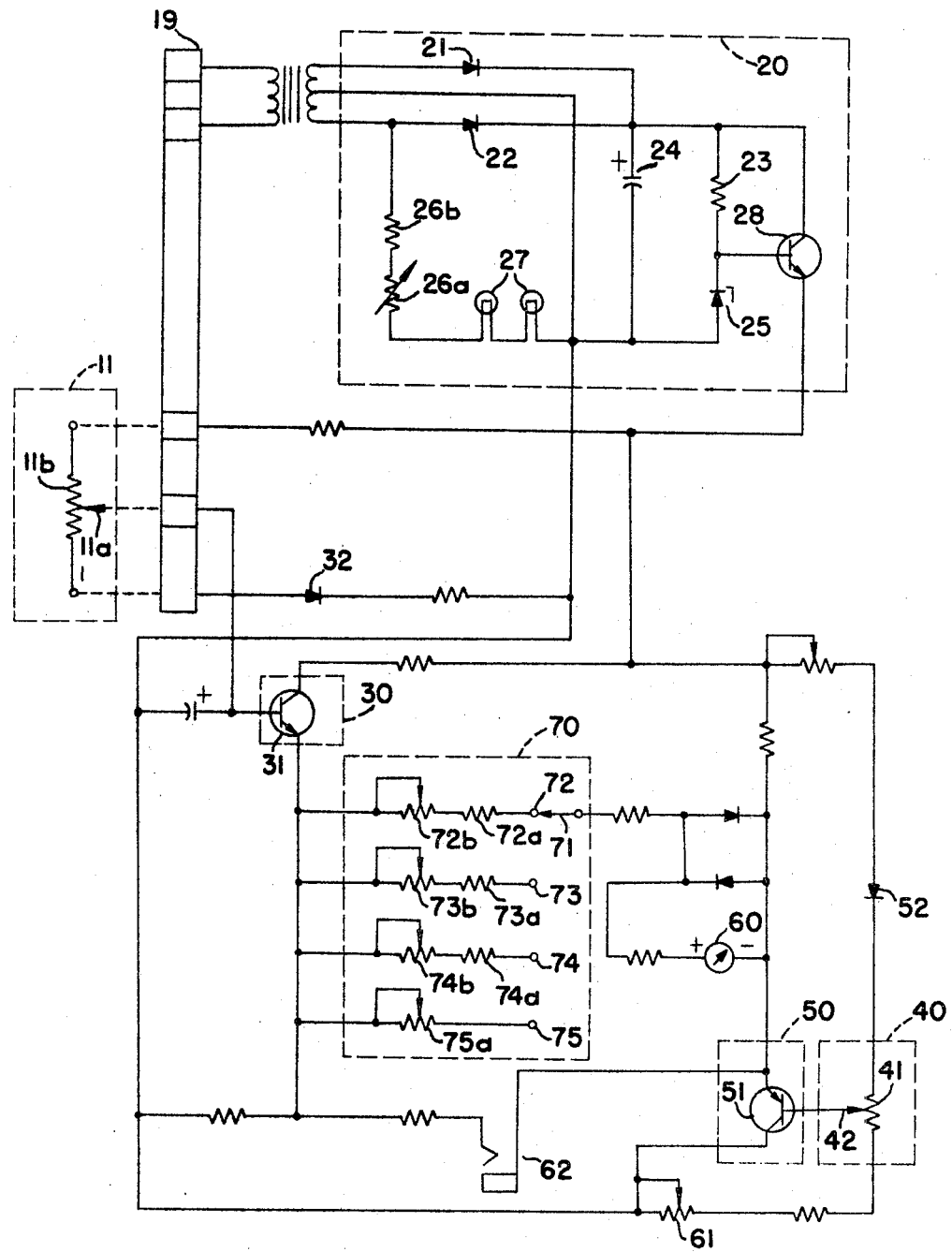
FIG. 3 is a schematic diagram of the invention.

Referring now to the drawings, there is shown a typical depthometer console 10, electrically coupled to a pressure transducer 11 disposed in a water medium. Nearly any one of a variety of pressure responsive transducers optionally is chosen, provided a signal is generated which is proportional to the depth at which the transducer is located. In order to realize the full benefits of the present invention, a transducer having a wide range should be selected. One that has performed very well in the prototype model of the invention is the Bourdon Tube pressure transducer Model 2007342009 marketed by the Bourns Company of Riverside, Calif. This transducer has a depth capability of 0 to 11,535 feet since it has a pressure responsiveness between 0 and 5,000 psia. Ambient water pressure transmitted to the Bourdon tube actuates a slider arm 11a of a precision resistor 11b. The precision resistor is excited from a remote source, power source 20, which is carried in the depthometer console.

A 115 volt, 60 Hz AC power source 19 is tapped by a coupling transformer and fed to the expandable depthometer power supply 20. A pair of diodes 21 and 22 and interconnecting components function as a full wave rectifier and a resistor 23, capacitor 24, and zener diode 25, coact as a voltage regulator to ensure that, among other things, that a precision excitation voltage is fed to the precision resistor of the pressure transducer. Also included in the power supply circuit are a pair of resistors 26 and 26a, the latter being a variable resistor, and to serially connected lamps 27. These elements indicate, firstly, that the circuit is on and secondly, serve to illuminate the dials and console interior. Lastly, in the power supply circuit, a regulator transistor 28 provides a low impedance output voltage at its emitter and couples the precision DC voltage to the transducer and all the other circuit elements to be described.

As mentioned above, the Bourdon Tube in transducer 11 responds to an ambient pressure found at a given depth and slider arm 11a is correspondingly displaced. Since precision resistor is excited by power supply 20, a voltage which is proportional to the given depth is fed to a transducer signal meter driver circuit 30. The signal meter driver circuit consists of a single transistor 31 which converts the depth-proportional voltage to a low source impedance. Preferably, a diode 32 is connected across the signal meter driver circuit to provide base-to-emitter temperature compensation for transistor 31.

The energizing potential supplied to the signal meter driver circuit from the power supply 20 also energizes a reference level control circuit 40. In its most practical form, the reference level control circuit is a precision variable resistor 41 provided with a slider arm 42. Rotation of a control knob 40a displaces the slider arm and a reference level signal is fed to the reference signal meter driver circuit 50.

The reference level signal developed across reference level control circuit 40 is predetermined to be that signal which a transducer of the type used in pressure transducer 11 generates at a predetermined depth. That is to say, when the scale carried on the outside of the depthometer console adjacent knob 40a registers a certain depth, for example, 5,000 feet, then slider arm 42 is positioned on precision variable resistor 41 to feed a reference level signal of discrete magnitude to reference signal meter driver circuit 50. The reference level signal has the same magnitude as a depth proportional signal appearing on slider arm 11a when the transducer is at the 5,000 foot level. Of course, reference signal meter driver circuit 50 includes a transistor 51 to provide a low-impedance impedance in much the same way as does transistor 31 in transducer signal meter driver circuit 30. In addition, transistor 51 has a diode 52 appropriately coupled for temperature compensation as does diode 32 temperature compensate transistor 31.

Both the reference level signal from the reference signal meter driver and the depth proportional signal from the transducer signal meter driver are fed to a display meter 60. The display meter is a commercially available meter, a Model 1145VT marketed by the Metermaster Company of San Diego, Calif. and has a dial showing fifty incremental graduations.

The meter is electrially interconnected in a bridge-type circuit and therefore has a capability for giving high resolution readings of transducer depths with respect to a reference level depth. If the reference level signal is equal to a depth proportional signal generated at 5,000 feet, then the meter will provide readings only when the depth proportional signal represents a depth greater than 5,000 feet. Similarly, if a reference level signal corresponding to a 2,000 foot level is fed to the meter, only those depth proportional signals generated by depth in excess of 2,000 feet will be shown on the meter.

Exactly what value each incremental graduation has on the meter dial is determined by a range scaler selector circuit 70. A range scale selector switch 71 is included and has the capability to be switched to one of four parallel branches, 72, 73, 74, or 75. Branch 72 includes a fixed resistor 72a having a value of 12.1 kilohms and a variable resistor 72b having a variable resistance of up to 0.5 kilohms. When the appropriate depth proportional signals are present, branch 72 will cause a one thousand full-scale deflection of display meter 60 over a one thousand foot change in depth. Branch 73 includes a fixed value resistor 73a having a value of 182 kilohms and a serially connected variable resistor having a value of 0 to 100 kilohms. Branch 73 causes a full scale deflection of meter 60 when the relative depth is changed from zero to 10,000 feet. Branch 74 has a fixed 9.3 kilohm resistor 74a serially connected to a 0 to 20 kilohms variable resistor 74b to give the meter a full scale deflection over a range of 5,000 feet when branch 73 is switched in by switch 71. Finally, branch 75, by having a single 0 to 0.5 kilohm resistor 75a allows a full scale deflection on display meter 60 on only 500 feet when branch 75 is switched in-circuit.

Should an operator turn knob 40a to indicate zero feet there will be a reference datum level signal fed to display meter which represents a transducer depth-proportional signal at zero feet. By switching in branch 72 to the display meter each of the 50 incremental graduations will have a value of 20 feet and the complete meter scale will cover the zero to 1,000 foot range. Interconnecting branch 73 in circuit gives meter 60 a full scale deflection from zero to 10,000 feet, or, 200 feet per incremental graduation. The zero to 5,000 foot full-scale deflection created by branch 74 causes each incremental graduation of the display meter 60 to have a 100 foot representation. And finally, with branch 75 switched in-circuit, the full scale deflection of the display meter represents the zero to 500 range in depth and each incremental graduation represents a 10 foot change in depth.

The same variable range capability described above can be used from datum levels other than zero. Providing a reference level signal correspondingly to a 5,000 foot transducer depth proportional signal will allow the ten foot incremental readings afforded by branch 75. These readings will extend from 5,000 feet to 5,500 feet. An operator must remember to add the meter readings and the depth indicated on the dial to arrive at the total depth.

Because the length of the electrical conductors varies as transducer 11 is played-out, a meter-zero adjustment 61 is interconnected between power supply 20 and reference signal meter driver 50. The adjustment is preferably a variable resistor-slider arm combination.

A record of the deployment of the transducer is provided for by the inclusion of a recorder 62. Optionally, a remote display unit is connected at this point in addition to the recorder.

By merely adjusting knob 40a and generating the suitable reference level datum signal the entire pressure range of transducer 11 is presented in high resolution on a single dial.

Obviously, many modifications and variations of the present invention are possible in the light of the above teachings, and, it is therefore understood that within the scope of the disclosed inventive concept, the invention may be practiced otherwise than specifically described.

What is claimed is:

1. A depthometer having an expandable scale comprising:
   means for generating a signal proportional to ambient pressure;
   means coupled to the generating means, for providing a visual readout in response to the proportional signal;
   means joined to the generating means and the providing means for setting a signal representative of a variable reference datum level from which relative depth readings are observed on the providing means;
   means coupled to the setting means for varying its impedance to ensure the zeroing of the providing means, such zeroing being necessitated by the varying length of leads joining the generating means to the providing means; and
   means coupled to the generating means for passing a low impedance said proportional signal to the providing means;
   means joined to the setting means and the providing means for feeding said signal representative of the variable reference datum level to the providing means;

means connected to the generating means, the providing means and the setting means for selecting a range scale for the providing means from which the visual readouts of the relative depth readings are observed; and means connected to all the aforerecited means for supplying power thereto.

2. A depthometer according to claim 1 in which the generating means is a pressure transducer excited by the supplying means for producing a voltage proportional to transducer depth and the selecting means is an arrangement of parallel impedance branches and a selector switch displaceable to electrically interconnect a single one of the impedance branches at one time.

3. A depthometer according to claim 2 in which the setting means is a variable resistor connected to a control knob for adjusting the signal representative of a reference datum level.

4. A depthometer according to claim 3 in which the passing means and the feeding means are transistors and each have a diode suitably interconnected for temperature compensation.

* * * * *